US005126390A

United States Patent [19]

Duff

[11] Patent Number: 5,126,390

[45] Date of Patent: Jun. 30, 1992

[54] COATING FORMULATIONS FOR THE PREPARATION OF TRANSFER ELEMENTS

[75] Inventor: James M. Duff, Mississauga, Canada

[73] Assignee: Xerox Corporation, Stamford, Conn.

[21] Appl. No.: 617,229

[22] Filed: Nov. 23, 1990

[51] Int. Cl.[5] .............................................. C08L 91/06

[52] U.S. Cl. .................................... 524/276; 524/275; 524/277; 524/475; 524/487; 524/763

[58] Field of Search ............... 524/275, 276, 277, 475, 524/763, 487

[56] References Cited

U.S. PATENT DOCUMENTS

| | | | |
|---|---|---|---|
| 3,314,814 | 4/1967 | Newman | 117/36.1 |
| 3,337,361 | 4/1967 | Count | 117/36.1 |
| 3,468,692 | 9/1969 | Winzer | 117/36.4 |
| 3,472,674 | 10/1969 | Kite, Jr. | 117/36.1 |
| 3,904,803 | 9/1975 | Brown et al. | 428/320 |
| 3,925,273 | 12/1975 | Cuthbertson et al. | 260/17 A |
| 4,034,128 | 7/1977 | Kelley | 427/150 |
| 4,087,580 | 5/1978 | McElligott et al. | 428/307 |
| 4,112,178 | 9/1978 | Brown | 428/306 |
| 4,168,338 | 9/1979 | Kato et al. | 428/219 |
| 4,324,817 | 4/1982 | Dahm et al. | 427/150 |
| 4,363,664 | 12/1982 | Delany | 106/21 |
| 4,527,993 | 7/1985 | Schuster et al. | 8/471 |

FOREIGN PATENT DOCUMENTS

| | | | |
|---|---|---|---|
| 3130547 | 3/1983 | Fed. Rep. of Germany | 524/277 |

*Primary Examiner*—Paul R. Michl
*Assistant Examiner*—Peter Szekely
*Attorney, Agent, or Firm*—Judith L. Byorick

[57] ABSTRACT

Disclosed are water-based transfer element coating formulations suitable for forming transfer elements for impact printing, thermal printing, typewriting, and the like, which comprise a wax-in-water emulsion, an oil, an aqueous polymer emulsion, a colorant, an optional water-soluble leveling agent, and an optional inert filler, said coating formulation containing substantially no volatile organic compounds. Also disclosed are processes for preparing transfer elements with these coating formulations and printing processes employing the transfer elements thus prepared.

29 Claims, No Drawings

COATING FORMULATIONS FOR THE PREPARATION OF TRANSFER ELEMENTS

BACKGROUND OF THE INVENTION

The present invention is directed to coating formulations for the preparation of transfer elements. More specifically, the present invention is directed to water-based transfer element coating formulations, processes for making transfer elements with water-based formulations, and processes for using the transfer elements thus prepared. In one embodiment, the transfer element coating formulations of the present invention comprise a wax-in-water emulsion, an oil, an aqueous polymer emulsion, a colorant, an optional water-soluble leveling agent, and an optional inert filler, said coating formulations containing substantially no volatile organic compounds.

The term "transfer element" generally refers to a class of materials employed in printing processes, including both impact printing and nonimpact printing processes, such as carbon paper, typewriter ribbons, thermal transfer ink donor films, electro-resistive ribbons, and the like. Generally, a transfer element is an element, such as a sheet or a ribbon, comprising a substrate on which is coated a colored material such as an ink or a dye, which colored material is capable of being transferred from the substrate or donor sheet onto a receiver sheet, such as paper or transparency material, to form a visible image. Transfer of the colored material from the substrate to the receiver sheet can be by any suitable method, such as the application of heat to the substrate in the instance of thermal transfer printing, the application of pressure to the substrate in the instances of conventional typewriting, other impact printing processes, and carbon paper, the application of current in the instance of electro-resistive printing processes, and the like.

Thermal printing is a nonimpact printing process that enables formation of high resolution images. These printing processes are simple, offer low noise levels, and are very reliable over extended usages. Thermal printing processes may be classified into three categories. Direct thermal printing entails the imagewise heating of special papers coated with heat sensitive dyes, such that an image forms in the heated areas. Another method of thermal printing is known as the dye transfer or dye sublimation technique, and operates by heating a donor sheet coated with a sublimable dye. When the donor sheet is imagewise heated, the dye sublimates and migrates to the receiver sheet, which possesses a polymeric coating into which the dye diffuses, forming an image. A third method of thermal printing is known as thermal transfer printing. The thermal transfer printing process entails imagewise heating of a donor sheet containing ink, which donor sheet is in intimate contact with the heater on one side and with the receiver sheet on the other side. Imagewise heating of the donor sheet affects the ink in such a way as to cause it to transfer from the donor sheet to the receiver sheet, thereby resulting in image formation. Thermal transfer printing methods generally employ uncoated plain papers, which enables prints with acceptable appearance and excellent archival properties. In addition, the thermal transfer printing method may be employed for color printing applications by using ink donor sheets of the desired color or colors.

Thermal transfer printing processes generally employ a thermal print head, an ink donor sheet, and a receiver sheet. The side of the donor sheet containing the ink is placed in contact with the receiver sheet, and heat originating from the print head is then applied to the donor sheet. Heat conducted through the donor sheet increases the temperature of the ink, which may cause it to melt, soften, decrease in viscosity, or otherwise undergo a transition that enables at least some of the ink to transfer to the receiver sheet. After the receiver sheet and ink donor sheet are separated, an image remains on the receiver sheet. An alternative method of heating the ink donor sheet, known as resistive heating, employs an array of electrodes instead of thermal print head to generate a current between the electrodes and a grounded conductive layer in the ink donor sheet. This method is described in the IBM Journal of Research & Development, Vol. 29, No. 5, 1985, the disclosure of which is totally incorporated herein by reference.

Impact printing processes also employ transfer elements. For example, typewriters depend on transfer elements to make prints. In this instance a key strikes a ribbon or donor roll which is brought into contact with a sheet of paper or other receiver sheet such as a label, envelope or office form. The impact energy of such contact causes ink or other colored material on the transfer element to transfer to the receiver sheet, thereby forming a printed character in the shape of the raised surface of the key. Another type of impact printer in common use is the so-called dot matrix printer. These printers work like typewriters, using impact from a key to transfer colored material from a donor ribbon to a receiver sheet, except that a single key, comprising a matrix of fine pins which are electronically arranged to form characters, is used in place of the many individual keys of the typewriter. Yet another type of impact printing process employs carbon paper. In this instance, pressure is applied to the top sheet in a set of sheets wherein the surfaces of at least some of the sheets are coated with an ink or other colored material, thereby causing the ink or colored material to transfer from the coated sheet to the sheet in contact with the coating.

Many types of transfer elements are known for impact and other printing processes. For example, fabric ribbons consist of a roll of cloth which has been soaked with a specially formulated ink, a controlled amount of which is released to the receiver sheet during the printing process. This type of ribbon has been in use for more than 100 years. It is a multiple use ribbon in that the same area of the ribbon can be repeatedly struck to give prints of acceptable optical density until the ink becomes depleted. While fabric ribbons have mostly been replaced with new types of ribbon for typewriter applications, because of their robustness, they are commonly used in dot matrix printers.

Single strike ribbons afford a much denser and uniform print than a fabric ribbon. They generally comprise a densely colored thin coating on a plastic substrate which is entirely transferred to a receiver sheet during the printing process. Single strike correctable ribbons are a specially formulated version of single strike ribbons which have been designed to form a print which can be removed from the receiver sheet by a process involving abhesion to a sticky surface of a correction tape. Single strike correctable transfer elements are described in, for example, U.S. Pat. No. 3,825,437, U.S. Pat. No. 3,825,470, U.S. Pat. No. 4,092,280, U.S.

Pat. No. 4,161,551, and U.S. Pat. No. 4,260,664, the disclosures of which are totally incorporated herein by reference. The processes and formulations used to prepare single strike correctable transfer elements typically entail the use of organic solvents.

Multistrike ribbons comprise a spongy layer with ink trapped in the pores of the sponge. The spongy layer is coated on a thin plastic substrate. The printing process causes the expulsion of a controlled amount of ink from the spongy layer to the receiver sheet. Multiple strikes (typically up to about 6) can be made on the same area of the ribbon without loss in optical density. They are more economical to use than single strike transfer elements and generally result in better print quality than fabric ribbons.

Transfer elements are commonly manufactured by processes that entail either hot melt or organic-solvent based coating techniques. Hot melt coating, which is economically and environmentally attractive, has a disadvantage in that this coating method places viscosity and flow requirements on the formulation, which tends to restrict significantly the potential choices of materials in the formulation. For example, hot melt coating formulations generally contain low levels of pigment, do not contain high molecular weight polymers, and generally must contain ingredients that are soluble or readily dispersible in the melt. In addition, it is difficult to prepare uniform, very thin coatings of consistent quality by hot melt techniques. These disadvantages are significant drawbacks in that it is generally desirable to provide a uniform, highly pigmented coating on a very thin substrate, thus enabling a product that can provide maximum usage by incorporating a long, densely colored transfer element on a roll into a relatively small package.

Accordingly, organic solvent-based coating techniques are most frequently used to manufacture transfer elements. Organic solvent coating techniques, however, possess disadvantages in that they consume large volumes of solvents. For environmental reasons, these solvents must be recovered or incinerated under strict conditions, which greatly increases the cost of organic-solvent coating processes. In addition, the solvents themselves can be expensive, in some instances accounting for over 50 percent of the unit market cost of a coating.

Thus, there is a need for coating processes and formulations that do not have these disadvantages. The present invention is directed to transfer element formulations which comprise water-based emulsion coatings.

Transfer elements made according to the present invention are prepared from coating formulations containing substantially no volatile organic compounds. As used herein, the term "volatile organic compound" includes those organic liquids conventionally used in solvent coating operations, such as aliphatic hydrocarbons, branched and unbranched, typically with up to about 12 carbon atoms or more, aromatic hydrocarbons, such as benzene, toluene, xylene, and tetralin (tetrahydronaphthalene), aliphatic and aromatic alcohols, such as ethanol, isopropanol, butanol, amyl alcohol, benzyl alcohol, and the like, organic ketones, such as acetone, methyl ethyl ketone, methyl isobutyl ketone, benzophenone, and the like, halogenated aliphatic and aromatic compounds, such as chlorobenzene, carbon tetrachloride, chloroform, methylene chloride, bromobutane, dichlorodifluoromethane, and the like, organic ethers, organic amines, organic acids, organic esters, and any other organic compounds capable of evaporating to any significant degree under ambient and/or coating conditions and which can reside in the atmosphere. As used herein, the term "volatile organic compound" does not encompass materials with relatively low vapor pressures under ambient and coating conditions, such as the oil and polymer components of the coating formulations of the present invention or other organic compounds indicated herein as being possible coating formulation components. Typically, non-volatile organic compounds, including those contained in the coating formulations of the present invention, such as vegetable oils, refined rapeseed oil, mineral oils, and the like, have very low vapor pressures, typically less than about 1 millimeter of mercury at room temperature (20° to 25° C.) and high boiling point, typically about 300° C. or more, at atmospheric pressures.

Coating formulations containing water are known. For example, U.S. Pat. No. 3,337,361 (La Count) discloses a process for making a pigmented pressure-sensitive transfer coating which comprises depositing on a water impervious base a pigmented pressure sensitive transfer coating containing practically no oily plasticizer and comprising a water slurry containing a pigment, a binder, and a lubricant which is substantially incompatible with the binder, which is miscible or dispersible in water, which is non-volatile, and which has a specific gravity greater than the binder, removing water from the coating to dry it, and then subjecting the dried coating to a heat treatment to melt and fuse it and to cause a thin film of the lubricant to form between the base and the remainder of the coating, thereby to constitute a transfer layer. The binder is a wax in emulsion form and the lubricant is selected from the group consisting of ethylene glycol and polyethylene glycol and having a specific gravity greater than the wax. This patent also discloses a process which comprises mixing a water slurry containing magnetic iron oxide and polyethylene glycol with a wax dispersion containing modified Fischer-Tropsch wax, emulsifiable polyethylene, ester wax, an anionic dispersing agent, and water, coating a base carrier with the mixture at room temperature, removing the water from the coating, and melting and fusing the remainder of the coating to form a liquid film of polyethylene glycol adjacent to the base.

In addition, U.S. Pat. No. 3,904,803 (Brown et al.) discloses prressure-sensitive reusable transfer elements of the squeeze-out type having a microporous resinous ink-releasing layer firmly bonded to a flexible foundation. The transfer element is characterized by a bonding undercoating layer applied to the foundation as an aqueous composition comprising a mixture of two water-dispersible resinous binder materials, one of which is water-soluble and does not insolubilize on drying, and the other of which is insoluble in water in that it forms a water-insoluble film on drying. According to the teachings of this patent, the water-base composition is coated on a flexible foundation such as paper and provides a bonding layer with excellent bonding properties for microporous ink layers applied to this bonding layer either from water or from organic solvent vehicles. U.S. Pat. No. 4,112,178 (Brown) also discloses pressure sensitive transfer elements comprising water-applied resinous base coating supporting a resinous ink-releasing layer, characterized by the undercoating consisting essentially of a water-dispersible, water-insoluble hydrophilic polyurethane resin.

Further, U.S. Pat. No. 3,925,273 (Cuthbertson et al.) discloses essentially aqueous stable oil-in-water printing emulsions suitable for use in transfer printing processes, particularly textile printing processes. The printing emulsions comprise a sublimable disperse dye, an anionic dispersing agent, a water soluble film forming resin, a non-ionic emulsifying agent, a hydrocarbon mineral oil with a boiling point of at least 290° F. which is at least 50 percent distilled in the boiling range of 300° F. to 450° F., water, and a solid water soluble viscosity modifying agent. The emulsion has a viscosity in the range of 800 to 5,000 centipoise at 25° C.

Additionally, U.S. Pat. No. 4,034,128 (Kelley) discloses a rheologically stable aqueous dispersion of metal-modified novolak resin particles prepared by grinding an aqueous mixture of the metal-modified novolak resin and anionic polymeric dispersing agent in the presence of a small amount of an organo-phosphorus compound containing two or more phosphonic acid or alkali metal phosphonate groups per molecule. Dispersions of the metal-modified resin particles so produced can be incorporated in color developing coating compositions containing a binder which may be applied and dried on a carrier paper to produce a pressure sensitive color developing record sheet. U.S. Pat. No. 4,363,664 (Delaney) also discloses stable concentrated free-flowing aqueous dispersion compositions containing one or more colorless dyestuff precursors and one or more surface active agents useful in the manufacture of paper for pressure sensitive carbonless duplicating manifold systems and thermal marking systems.

Further, U.S. Pat. No. 4,527,993 (Schuster et al.) discloses a process for producing transfer printing papers with foamed aqueous dyestuff liquors in which the consistency of the foam acts as a thickening agent, thereby enabling reduction of the moisture content of the print paste. The dyestuff-containing liquor is made finely porous by means of surfactants into stable foams, and the transfer carrier is printed in the desired pattern with the foam and dried.

In addition, U.S. Pat. No. 3,314,814 (Newman) discloses a method of preparing a transfer element wherein the transfer composition comprises a film-forming hydrophilic or water-soluble binder material, a non-volatile oily material which is not compatible with the film-former, and a quantity of imaging material applied to a water-resistant foundation in the form of a solution in a miscible water-aliphatic solvent mixture and solidified by evaporation of the solvent mixture to form a microporous structure containing within its pores a pressure-exudable ink containing the oleaginous material and the imaging material.

Also of collateral interest with respect to the present invention are U.S. Pat. No. 3,468,692, U.S. Pat. No. 3,472,674, U.S. Pat. No. 4,087,580, U.S. Pat. No. 4,168,338, and U.S. Pat. No. 4,324,817.

Although known formulations are suitable for their intended uses, a need continues to exist for transfer element coating formulations that are water-based and that avoid the difficulties encountered with transfer elements prepared by hot melt coating techniques or by organic solvent coating techniques. There is also a need for transfer elements that can be prepared by economically attractive methods. Further, there is a need for transfer elements that can be prepared by environmentally safe methods. A need also exists for transfer element coating formulations that can be employed to prepare transfer elements with high pigment loadings. Further, a need exists for transfer elements wherein the coating of transfer material is desirably thin. There is also a need for single-strike transfer elements that can be prepared from aqueous emulsions of the coating components. Additionally, there is a need for aqueous processes for preparing a wide variety of transfer elements, including single strike impact transfer elements, single-strike correctable transfer elements, single strike thermal transfer ink transfer elements, carbon papers, and the like. A need also exists for aqueous processes for preparing transfer elements with a wide variety of colorants, including water soluble dyes, oil soluble dyes, pigments, magnetic solids, and invisible taggants such as fluorescent compounds and infrared light-absorbing materials. Further, there is a need for methods for preparing transfer elements that employ no volatile organic solvents.

SUMMARY OF THE INVENTION

It is an object of the present invention to provide water-based transfer element formulations.

It is another object of the present invention to provide transfer element formulations that avoid the difficulties encountered with transfer elements prepared by hot melt coating techniques or by organic solvent coating techniques.

It is yet another object of the present invention to provide transfer elements that can be prepared by economically attractive methods.

It is still another object of the present invention to provide transfer elements that can be prepared by environmentally safe methods.

Another object of the present invention is to provide transfer element formulations that can be employed to prepare transfer elements with high pigment loadings.

Yet another object of the present invention is to provide transfer elements wherein the coating of transfer material is desirably thin.

Still another object of the present invention is to provide single-strike transfer elements that can be prepared from aqueous emulsions of the coating components.

It is another object of the present invention to provide aqueous processes for preparing a wide variety of transfer elements, including single strike impact transfer elements, single strike correctable transfer elements, single strike thermal transfer ink transfer elements, carbon papers, and the like.

It is yet another object of the present invention to provide aqueous processes for preparing transfer elements with a wide variety of colorants, including water soluble dyes, oil soluble dyes, pigments, magnetic solids, and invisible taggants such as fluorescent compounds and infrared light-absorbing materials.

It is still another object of the present invention to provide methods for preparing transfer elements that employ no volatile organic solvents.

These and other objects of the present invention are achieved by providing a water-based transfer element coating formulation comprising a mixture of a wax-in-water emulsion, an oil, an aqueous polymer emulsion, a colorant, an optional water-soluble leveling agent, and an optional inert filler, said coating formulation containing substantially no volatile organic compounds. The oil component can be present as a component of the wax-in-water emulsion, or it can be introduced into the mixture as a separate oil in water emulsion. Another embodiment of the present invention resides in a process for preparing transfer elements which comprises (1) preparing a wax-in-water emulsion; (2) preparing an aqueous polymer emulsion; (3) admixing the wax-in-water emulsion and the aqueous polymer emulsion with a colorant and an oil to form an aqueous coating formulation containing substantially no volatile organic compounds; (4) coating the coating formulation onto a substrate; and (5) drying the coating formulation on the substrate to remove the water. Still another embodiment of the present invention is directed to a thermal printing process which comprises incorporating into the thermal printing apparatus a transfer element prepared by the process of the present invention and applying heat imagewise to the element, causing the coating to be heated and transferred from the transfer element substrate to a receiver sheet. Another embodiment of the present invention is directed to an impact printing process which comprises incorporating into an impact printing apparatus, such as a typewriter or a dot matrix printer, a transfer element prepared by the process of the present invention and applying pressure imagewise to the transfer element, causing the coating to be transferred from the transfer element substrate to a receiver sheet. An extension of this embodiment is directed towards abhesively eradicable transfer elements which are commonly used in correctable typewriters. Another embodiment of the present invention is directed to carbon papers, the uses of which are widespread, being used in impact printing devices as well as with handwriting to make multiple copies of a document.

DETAILED DESCRIPTION OF THE INVENTION

The transfer element coating formulation of the present invention includes a wax-in-water emulsion. While wax is a major component of the coating formulations of the present invention and has a dominant effect on the properties of the transfer element, a simple dispersion of pigment or colorant in wax alone will not result in a transfer element possessing desirable characteristics. The combination of components in the coating formulations of the present invention provides a variety of types of transfer elements having the properties required for diverse applications.

The wax ingredient of the transfer element formulations of the present invention provides structural strength in the transfer element by acting as a cement to bind together the other dispersed ingredients. This ingredient can also affect the leveling, release, and smear resistance of the transfer element. The wax-in-water emulsion is prepared by heating a wax or a blend of wax and wax-soluble additives, such as oil or a wax-compatible polymer resin, typically to a temperature of from about 70° to about 150° C., preferably from about 110° C. to about 120° C. (with the temperature being selected in view of the melting point of the wax and the solubility of the additive in the wax) in the presence of an emulsifier, followed by pouring the resulting solution slowly into vigorously stirred water, typically at a temperature of from about 75° C. to about 99° C., preferably from about 95° C. to about 98° C. The amount of water can be varied to affect the final solids content of the emulsion, with the solids content typically being from about 5 to about 55 percent by weight. The resulting emulsion can be milky to almost transparent, and is stirred, typically at a temperature of from about 75° to about 99° C., preferably from about 95° C. to about 98° C., for an effective period, generally from about 1 to about 30 minutes and preferably from about 1 to about 10 minutes, and is then cooled rapidly, typically over a period of from about 1 to about 5 minutes to a temperature below about 50° C. with stirring. The emulsion contains an effective amount of the wax, generally from about 5 to about 55 percent by weight, and preferably from about 20 to about 40 percent by weight.

Examples of suitable waxes include natural waxes, such as beeswax, carnauba wax, bayberry wax, candellila wax, and the like; mineral waxes, such as Montan wax and ozokerite; synthetic waxes, such as low molecular weight polyethylene waxes, typically with a molecular weight of from about 2,000 to about 6,000, vinyl ether waxes, Fischer-Tropsch waxes, oxidized Fischer-Tropsch waxes, and the like; petroleum waxes, such as paraffin waxes; and any other waxes that will form a stable aqueous emulsion and function as a binder in the formulations of the present invention. Generally, any wax of the above generic classes is suitable. A wide variety of waxes is available from suppliers such as BASF, International Wax Refining Company, Witco, Shamrock Chemicals Corporation, Strahl & Pitsch, Dura Commodities Corporation, Petrolite Corporation (Bareco Division), Frank B. Ross Company, Inc., Allied Corporation, and the like. Preferred waxes are hard, readily emulsifiable waxes, such as Hoechst Wax E (Montan wax), BASF Wax OA (emulsifiable polyethylene wax with a molecular weight of about 4,000), any grade of Carnauba wax (available from International Wax Refining Company or from Durachem), Hardwax EDM (vinyl ether based wax available from Durachem), Duroxon H111 (oxidized Fischer-Tropsch wax available from Durachem), and the like.

Examples of wax soluble additives include mineral or vegetable oils, dyes, or any of a large variety of resins and polymers, such as terpene resins and ethylene-vinyl acetate copolymers which can dissolve in hot wax and result in a stable emulsion. For example, an oil soluble dye such as Sudan Blue or Oil Red O (available from Aldrich Chemical Company) can be dissolved in the wax melt prior to emulsification, typically in an amount of from about 1 to about 5 percent by weight of the wax. This additive can also optionally serve as a colorant instead of or in addition to a dispersed pigment. In addition, additives such as ethylene/vinyl acetate copolymers, such as Elvax 420 (available from E.I. Du Pont de Nemours & Company), or vinyl toluene/methylstyrene copolymers, such as Piccotex 100 (available from Hercules Inc.), or terpene resins, such as Nirez 1085 (available from Reichold Chemicals), can be added, typically in an amount of from about 1 to about 30 percent by weight of the wax, to impart desirable properties such as improved rub and smear resistance to the print generated with the transfer element or improved adhesion of the coating to the substrate of the transfer element. Generally, additives are present in the wax-in-water emulsion in an effective amount, typically from about 1 to about 60 percent by weight of the wax, preferably from about 5 to about 30 percent by weight of the wax, and more preferably from about 10 to about 20 percent by weight of the wax.

Examples of suitable emulsifiers include anionic amine soaps, such as morpholine oleate or aminomethylpropanol stearate, and a variety of commercially available non-ionic emulsifiers, such as the Emulan or Lutensol emulsifiers available from BASF or the Span, Tween, or Atlas emulsifiers available from ICI. The emulsifier is present in an effective amount, generally from about 5 to about 30 percent by weight of the wax, and preferably from about 15 to about 25 percent by weight of the wax.

The wax-in-water emulsion is present in the transfer element coating formulation in any effective amount, typically from about 1 to about 10 percent by weight, and preferably from about 2 to about 5 percent by weight. The wax component is present in the solids content of the total coating formulation in any effective amount, typically from about 5 to about 50 percent by weight, and preferably from about 10 to about 30 percent by weight.

The transfer element coating formulations of the present invention also contain an oil. This ingredient tends to plasticize the coating, and thus prevents flaking off of the coating of colored transfer material when the substrate is bent and facilitates transfer of the colored transfer material from the substrate to the receiver sheet during printing. The oil also contributes to sharp edge definition of printed characters. The oil can be incorporated into the coating formulation as an oil-in-water emulsion, or as an ingredient in the wax-in-water emulsion. When present as an oil-in-water emulsion, this ingredient is prepared by mixing an oil with an emulsifier, in relative amounts typically from about 5 parts by weight to about 30 parts by weight of emulsifier per 100 parts by weight of oil, at a temperature typically from about 20° to about 75° C., preferably about 50° C., followed by adding the solution thus formed to vigorously stirred water in a ratio of oil to water typically from about 1:19 to about 1:3 at a temperature typically from about 20° to about 75° C., preferably about 50° C. The resulting emulsion is generally milky and contains an effective amount of the oil, with the total amount of oil and emulsifier (solids content) typically being from about 5 to about 50 percent by weight, and preferably from about 20 to about 40 percent by weight.

When the oil is present as a component of the wax-in-water emulsion, the wax-in-water emulsion is prepared by heating a mixture of oil in wax in a ratio typically ranging from a ratio of about 1 part oil to about 19 part wax to a ratio of about 4 parts by weight oil to about 1 part by weight wax along with an emulsifier, typically in an amount of from about 5 to about 30 percent by weight of the total oil and wax mixture, at a temperature typically from about 75° to about 150° C. The mixture thus formed is then slowly added with vigorous stirring to water in an amount typically ranging from a ratio of about 1 part by weight mixture to about 19 parts by weight water to a ratio of about 1 part by weight mixture to about 1 part by weight water. The water is maintained at a temperature typically from about 75° to about 99° C. during the addition. The resulting white emulsion is then stirred, generally at a temperature of from about 75° to about 99° C. for from about 5 to about 45 minutes, and is then rapidly cooled, typically to a temperature of about 40° C. over a period typically from about 3 to about 10 minutes by immersing the emulsion in a water bath. The resulting emulsion contains the oil/wax mixture in an effective amount, generally from about 5 to about 50 percent by weight, and preferably from about 20 to about 40 percent by weight. When the oil component is present as part of the wax-in-water emulsion, the emulsion typically contains the oil in an amount of from about 1 to about 20 percent by weight, and preferably in an amount of from about 5 to about 15 percent by weight. When the oil component is present as part of the wax-in-water emulsion, the oil component is present in the solids content of the total coating formulation in any effective amount, typically from about 1 to about 30 percent by weight, and preferably from about 5 to about 20 percent by weight.

Examples of suitable oils include any non-curing vegetable oil, such as sunflower oil and rapeseed oil, any animal oil, such as castor oil and fish oil, any mineral oil, such as the Nujol oils available from Witco, the Blandol series of oils available from Witco, and the Magiesol series of oils available from Magie Brothers, with the preferred oils being mineral oils with a relatively low viscosity, typically from about 10 to about 100 centipoise, and a relatively high boiling point, typically more than 300° C., such as Blandol, available from Witco, or low cost vegetable oils such as refined bleached rapeseed oil, available from L. V. Lomas Company.

The emulsifier can be any anionic or non-ionic emulsifier compatible with the oil selected. Preferred emulsifiers include the non-ionic emulsifiers Span 40 (sorbitan monopalmitate) and Tween 65 (polyoxyethylene (20) sorbitan tristearate), available from ICI. The choice of emulsifier for a particular oil depends on a number of factors, such as the matching of the HLB number of the emulsifier system to the oil. Details regarding this matching process are well known and are disclosed in, for example, the booklet "The HLB System, A Time-Saving Guide to Emulsifier Selection," published by ICI Americas, Inc. of Delaware (1984 revision), the disclosure of which is totally incorporated herein by reference. For example, Tween 65 typically is suitable for most mineral oils and Span 40 typically is suitable for rapeseed oil.

When the oil is present as an oil-in-water emulsion, the oil-in-water emulsion is present in the transfer element coating formulation in an effective amount, generally from about 5 to about 50 percent by weight, and preferably from about 15 to about 30 percent by weight. When the oil is present as an oil-in-water emulsion, the oil component is present in the solids content of the total coating formulation in any effective amount, typically from about 1 to about 50 percent by weight, and preferably from about 5 to about 20 percent by weight.

The aqueous polymer emulsion ingredient of the transfer element coating formulations of the present invention can provide many advantages, such as cementing together the other coating components, reducing surface tack, improving correctability of adhesively eradicable coatings in that a highly efficient (typically greater than 90 percent) removal of the transferred image by the adhesive correction tape can be achieved, improving adhesive properties both to the substrate and to the receiver sheet on which a print is formed, and the like. Examples of suitable polymers include generally all acrylic polymers and acrylic copolymers which can be prepared as aqueous emulsions. Specific examples of suitable homopolymers include polymers prepared from the following monomers: alkyl acrylates and alkyl methacrylates, such as methyl-, ethyl-, propyl-, isopropyl-, butyl-, isobutyl-, sec-butyl-, and other linear and branched alkyl acrylates and methacrylates, typically having from about 5 to about 18 carbon atoms, such as the Neocryl A601, A604, A612 and A614 products available from ICI. Examples of suitable copolymers include combinations of any of the above acrylate and methacrylate monomers, combinations of styrene with one or more of the above acrylate and methacrylate monomers, such as the BASF products Poligen ASN, MV150, and MV160, combinations of butadiene with one or more of the above acrylates and methacrylates, combinations of styrene and butadiene with one or more of the above acrylates and methacrylates, and the like. Optionally the polymers and copolymers can have a low level of from 0.1 to about 5 percent by weight of a crosslinking agent, which can modify their properties. Generally, two types of polymers are suitable for the coatings of the present invention: relatively soft and tacky film-forming polymers which tend to improve the fix and adhesive properties of the coating, and relatively hard polymers that generally do not form flexible films and tend to improve smear resistance, decrease tack, and improve correctability. One example of a suitable soft, film-forming acrylic copolymer emulsion is Poligen ASN, an emulsion of a styrene-acrylic copolymer containing 40 percent by weight solids and having a film forming temperature of 50° C., available from BASF. Examples of suitable hard polymers include the Poligen MV 150 and 160 polymers available from BASF, which are crosslinked styrene acrylic copolymer emulsions containing 40 percent by weight solids. The polymer emulsion contains the polymer in an effective amount, generally from about 5 to about 40 percent by weight, and preferably from about 20 to about 40 percent by weight. Aqueous polymer emulsions are widely commercially available, and include the BASF Poligen series, the Johnson Wax Joncryl series, and the like. Polymer emulsions can also be prepared by conventional emulsion polymerization techniques as described, for example, in the textbooks *Principals of Polymerization*, by G. Odian (John Wiley and Sons) and *Emulsion Polymerization*, by I. Piirma (Academic Press) and references cited therein, the disclosures of each of which are totally incorporated herein by reference. In some instances, the transfer elements of the present invention can contain polymer emulsions of polymers with a relatively low film forming temperature of, for example, from about 35° to about 80° C., preferably from about 40° to about 60° C. These polymers are relatively soft and can impart desirable properties such as improved fix to both the substrate and to the receiver sheet on which the image is formed, improved smear resistance and improved leveling during the coating process. When the transfer element is an adhesively eradicable (correctable) transfer element, emulsions of hard, cross-linked styrene acrylic copolymers, such as BASF Polygen MV 150 and MV 160, provide ribbons of superior correctability. The polymer emulsion is present in the transfer element formulation in an effective amount, generally from about 5 to about 70 percent by weight, and preferably from about 10 to about 50 percent by weight. The polymer component is present in the solids content of the total coating formulation in any effective amount, typically from about 5 to about 50 percent by weight, and preferably from about 15 to about 30 percent by weight.

Transfer element coating formulations of the present invention can optionally contain a leveling agent. A transfer element formulation, when coated onto a substrate, generally should wet the substrate and level well to provide a uniform coating to avoid deletions, significant density variations, and other defects in prints made from the transfer element. In some instances, the wetting characteristics of a transfer element formulation can be enhanced by the addition of one or more leveling agents. Suitable leveling agents include water soluble polymers such as cellulosic derivatives, including hydroxypropyl cellulose, ethyl cellulose, carboxymethyl cellulose, and the like, polyvinyl alcohol, polyalkylene glycols such as polyethylene glycol, polypropylene glycol, copolymers of propylene and ethylene glycol, and the like. Commercially available agents such as perfluorinated surfactants, including Zonyl S (available from E.I. Du Pont de Nemours & Company), WS 215 wax, a low melting water soluble glycol-based wax available from Durachem, and the like, as well as mixtures thereof, are also suitable. When present, the leveling agent is present in the transfer element liquid coating formulation in an effective amount, generally from about 0.1 to about 20 percent by weight, and preferably from about 1 to about 5 percent by weight. As a component of the solids content of the coating formulation, the leveling agent is present in an effective amount, typically from about 0.5 to about 25 percent by weight, and preferably from about 2 to about 15 percent by weight.

In addition, the transfer element formulations of the present invention can optionally contain an inert filler. The inert filler can improve transfer element characteristics such as optical density, uniformity of coating, improved edge acuity of characters, improved release of the transfer element coating from the substrate, improved lift off of characters from the receiver sheet in adhesively eradicable transfer elements, and the like. Examples of suitable inert fillers include celite, such as Celite #577 available from Johns Manville, talc, chalk, zeolite, silica, high molecular weight polyethylene (typically with a molecular weight of from about 100,000 to about 1,000,000), and the like, as well as mixtures thereof, with an average particle diameter (after processing into the coating formulation by a grinding operation such as ball milling) of from about 0.1 to about 50 microns, and preferably from about 1 to about 20 microns. When present, the inert filler is present in the transfer element liquid coating formulation in an effective amount, generally from about 1 to about 12 percent by weight, and preferably from about 2 to about 6 percent by weight. As a component of the solids content of the coating formulation, the inert filler is present in an effective amount, typically from about 5 to about 50 percent by weight, and preferably from about 10 to about 30 percent by weight.

The transfer element formulations of the present invention include a colorant to impart the desired color to the formulation. Generally, any pigment can be readily dispersed in the other ingredients of the transfer element formulations of the present invention without the need for an additional dispersing agent. Suitable pigments include a variety of carbon blacks, colored organic and inorganic pigments, magnetic materials such as magnetite, and the like, as well as mixtures thereof, can be incorporated into the coatings in amounts of up to 80 percent by weight of the dry solids weight. Examples of suitable pigments include Violet Toner VT-8015 (Paul Uhlich), Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (CibaGeigy), Paliogen Red 3871K (BASF), Paliogen Red 3340 (BASF), Lithol Fast Scarlet L4300

(BASF), Heliogen Blue L6900, L7020 (BASF), Heliogen Blue K6902, K6910 (BASF), Heliogen Blue D6840, D7080 (BASF), Sudan Blue OS (BASF), Neopen Blue FF4012 (BASF), PV Fast Blue B2G01 (American Hoechst), Irgalite Blue BCA (Ciba-Geigy), Paliogen Blue 6470 (BASF), Sudan III (red orange) (Matheson, Coleman, Bell), Sudan II (orange) (Matheson, Coleman, Bell), Sudan IV (orange) (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FGL (Hoechst), Permanent Yellow YE 0305 (Paul Uhlich), Lumogen Yellow D0790 (BASF), Suco-Gelb L1250 (BASF), Suco-Yellow D1355 (BASF), Sico Fast Yellow D1355, D1351 (BASF), Hostaperm Pink E (American Hoechst), Fanal Pink D4830 (BASF), Cinquasia Magenta (DuPont), Paliogen Black L0084 (BASF), Pigment Black K801 (BASF), and carbon blacks such as Regal 330® (Cabot), Carbon Black 5250 and Carbon Black 5750 (Columbian Chemicals Company). Preferred pigments include high surface area carbon blacks such as Columbian Raven 3500 and Raven 5250, Black Pearls L (Cabot Corporation), treated or laked carbon blacks such as Toner 8200 (molybdated carbon black available from Paul Uhlich Company), and the like. In addition, predispersed pigments such as Basoflex (series of liquid, water dispersible pigments available from BASF) and Basoprint (series of water dispersible products available from BASF) are suitable and also require less processing time to yield a well dispersed coatings than do untreated dry pigments. The pigment is present in the transfer element liquid coating formulation in an effective amount, generally from about 1 to about 10 percent by weight, and preferably from about 2 to about 6 percent by weight. As a component of the solids content of the coating formulation, the pigment is present in an effective amount, typically from about 5 to about 50 percent by weight, and preferably from about 10 to about 30 percent by weight of the solids. As indicated previously herein, the colorant can also include or consist entirely of one or more dyes present in any amount effective to impart to the coating the desired degree of color.

Optionally, the transfer element coating formulations can also contain an antifoaming agent to improve uniformity of the coating by ensuring that bubbles of foam in the wet coating burst rapidly. Many commercially available antifoaming agents are suitable, such as the Pluronic and Etingal series available from BASF, the DEE FO series available from Ultra Adhesives Inc., the AF series of silicone defoamers available from General Electric, and the like, as well as mixtures thereof, with a preferred antifoaming agent being BASF Etingal A, a phosphate ester. The antifoaming agent, if present, is contained in the transfer element liquid coating formulation in an effective amount, generally from about 0.01 to about 2 percent by weight, and preferably from about 0.02 to about 1 percent by weight. As a component of the solids content of the coating formulation, the antifoaming is present in an effective amount, typically from about 0.02 to about 2 percent by weight, and preferably from about 0.05 to about 0.2 percent by weight of the solids.

Transfer element coating formulations of the present invention can be prepared by mixing together the ingredients to form a dispersion and processing the dispersion with, for example, a ball mill, an attritor such as a Union Process attritor, a high shear mixer, or the like until the pigment and, if present, the filler, are dispersed to the desired particle size. Generally, desired particle sizes for black formulations are from about 0.01 to about 20 microns, and preferably from about 0.1 to about 1 micron, and for color formulations are from about 0.01 to about 0.5, and to obtain optimal color quality are preferably from about 0.01 to about 0.2 micron to avoid light scattering effects. Generally, processing is for from about 1 to about 72 hours, with processing times of from about 0.5 to about 4 hours being possible with a Union Process attritor.

When the ingredients are mixed, the coating formulations of the present invention typically contain water in an amount of from about 70 to about 90 percent by weight and solids in an amount of from about 10 to about 30 percent by weight. The solids content typically contains the wax in an amount of from about 5 to about 50 percent by weight, the oil in an amount of from about 1 to about 50 percent by weight, the polymer in an amount of from about 5 to about 50 percent by weight, and the colorant in an amount of from about 5 to about 50 percent by weight. When a leveling agent is present, it typically comprises from about 0.5 to about 25 percent by weight of the solids content. When an inert filler is present, it typically comprises from about 5 to about 50 percent by weight of the solids content. The entire coating formulation typically comprises water in an amount of from about 70 to about 90 percent by weight, the wax in an amount of from about 1 to about 12 percent by weight, the oil in an amount of from about 1 to about 12 percent by weight, the polymer in an amount of from about 1 to about 12 percent by weight, and the colorant in an amount of from about 1 to about 12 percent by weight, with any leveling agent being present in an amount of from about 0.1 to about 20 percent by weight of the total liquid mixture and any inert filler being present in an amount of from about 1 to about 12 percent by weight of the total liquid mixture.

The transfer element formulation is then coated onto a substrate. Any of a number of substrates are suitable, including condensor paper, plastics such as polyethylenes, polypropylenes, polycarbonates, polyamides, polyesters, and the like. Generally, thin (about 40 to about 75 gauge) films such as polyethylene or polyester are preferred for single strike and single strike correctable impact or pressure transfer elements such as typewriter ribbons. For thermal transfer ink donor films, substrates such as polyester films, both untreated and metallized, such as aluminized Mylar®, titanized Mylar®, and the like can be employed, generally having a thickness of from about 0.4 to about 1.2 microns, and preferably from about 0.5 to about 0.8 micron.

Any of a variety of coating techniques can be employed to apply the transfer element formulation to the substrate, including wire rod coating, gravure coating, slot dye coating, reverse roll coating, or any other method, as discussed in, for example, the book "Coating and Laminating Machines," H. L. Weiss, Converting Technology Company (1977), the disclosure of which is totally incorporated herein by reference. An example of a suitable laboratory scale or hand coating procedure entails taping a substrate film onto a level polished flat glass drawdown plate (available from Paul N. Gardner Company), and coating with a wire rod of any suitable size, from #2½ (0.25 mil wet film thickness) to #30 (3.0 mil wet film thickness), depending on the solids content of the coating dispersion (for example, a 2 mil thick wet film at 20 percent solids content when dried results in a dried film thickness of about 0.4 mil; 2 mils (wet)×0.2 (solids content)=0.4 (dry)) to yield an effective final dry film thickness, generally from about 0.05 to about 2.5 mil, and preferably from about 0.1 to about 0.3 mil. Generally, the coating dries in from about 1 to about 5 minutes at ambient temperature, and proportionately faster at elevated temperatures. As with all coatings on plastic films, the drying temperature should be controlled to avoid difficulties such as weakening or curling of the substrate or melting and deleveling of the coating. The temperature is kept below the glass transition or softening temperature of the plastic, and in the case of differences in the thermal expansion and contraction between coating and substrate, curling will occur unless the coated film is carefully annealed by slow cooling.

Coating formulations of the present invention exhibit many desirable characteristics. For example, the coatings level well on substrates to result in films of uniform thickness. In addition, when the water has been removed from the coating, the dried coating adheres well to the substrate and does not flake off when the substrate is bent or rolled, or is processed into ribbons by, for example, a slitting and packaging operation. Further, the transfer elements formed from the coatings exhibit relatively low surface tack or stickiness, so that when they are formed into tight rolls, the coating will not adhere to the back of the substrate in contact with it in the roll and thereafter fail to unroll properly without peeling of the coating or other structural damage.

In addition, the transfer elements of the present invention exhibit desirable properties during printing processes. For example, they exhibit acceptable color or optical density, typically with optical densities being over 1 optical density units for black or other dark colors. In addition, the coating is uniformly transferred to the receiver sheet during printing with high efficiency (generally greater than about 90 percent). In the case of adhesively eradicable (correctable) transfer elements of the present invention, the transferred image is removed with high efficiency (generally greater than about 90) from the receiver sheet by the adhesive correcting tape, yet the images also exhibit adequate fix to the receiver sheet. The images formed with the transfer elements of the present invention exhibit adequate fix to the final receiver sheet, so that the transferred image is not smeared by rubbing against skin, clothing or other sheets of paper. Further, the images exhibit good edge acuity of the transferred characters, so that their exact shape is obtained on the copy. Transfer elements of the present invention result in prints that exhibit very low background developement; background development can result when light contact to the transfer element when the element contacts the receiver sheet causes transfer of the coating to the receiver sheet in areas other than desired image areas. For example, in a thermal transfer printing process, the coating of the transfer element will be activated only by heat, and will not undergo any pressure-induced transfer (carbon paper effect) to the receiver sheet. In an impact printing process, the coating will not transfer to the receiver sheet under the mild pressure which holds the ribbon against the receiver sheet.

Specific embodiments of the invention will now be described in detail. These examples are intended to be illustrative, and the invention is not limited to the materials, conditions, or process parameters set forth in these embodiments. All parts and percentages are by weight unless otherwise indicated.

PREPARATION OF TRANSFER ELEMENT FORMULATION COMPONENTS

Example 1

An anionic wax-in-water emulsion was prepared as follows. In a 250 milliliter beaker, a mixture of 80 grams of Duroxon H111, a partially oxidized Fischer-Tropsch wax available from Durachem, and 10 grams of Emersol 233, an oleic acid available from Emery Industries, was heated on a hot plate. The mixture was stirred manually with a thermometer until the temperature reached 110° C., by which time a homogeneous wax melt had formed. The melt was treated with 14 grams of morpholine, which reacted with the oleic acid to form the emulsifier, morpholine oleate, and the resultant solution was maintained at a temperature between 110° and 120° C. Meanwhile, 320 grams of deionized water was heated on a hot plate stirrer in a 600 milliliter beaker until the temperature reached 95° to 98° C. The water was stirred using a large magnet so that a deep vortex was formed. Subsequently, the wax melt containing the morpholine oleate was poured in a steady stream into the edge of the vortex of the water at a rate which resulted in complete addition of the wax in about 2 minutes. Following the addition, the resultant almost clear dispersion was stirred at 95° to 98° C. for about 3 additional minutes, and was then transferred to a cold water bath and stirred rapidly for about 3 minutes until it reached a temperature of about 45° C. The almost transparent emulsion was subsequently transferred to a storage bottle and the total weight of the completed emulsion was made up to 400 grams by the addition of deionized water. The emulsion thus formed contained about 20 percent by weight wax and about 6 percent by weight of the emulsifying agent.

Additional anionic wax-in-water emulsions were prepared by repeating the above process but instead using the waxes or mixtures of wax and additive indicated in the Table. In all cases, the total weight of wax or mixture of wax and additive was 80 grams, the amount of oleic acid was 10 grams, and the amount of morpholine was 14 grams.

| Example No. | Wax | wt (g) | Additive | wt (g) |
|---|---|---|---|---|
| 1A | Duroxon H111, an oxidized Fischer Tropsch wax from Durachem | 80 | — | — |
| 1B | Hoechst Wax E, a Montan wax | 80 | — | — |
| 1C | #2 North Country Light Carnauba Wax from International Wax Refining Co. | 80 | — | — |
| 1D | BASF Wax OA, an emulsifiable polyethylene | 80 | — | — |
| 1E | Durachem Hardwax EDM, a vinyl ether-based wax | 80 | — | — |
| 1F | Refined Beeswax, #545 from International Wax Refining Co. | 80 | — | — |
| 1G | Bayberry Wax, #615 from International Wax Refining Co. | 80 | — | — |

-continued

| Example No. | Wax | wt (g) | Additive | wt (g) |
|---|---|---|---|---|
| 1H | Duroxon H111 | 40 | Witco Blandol Mineral Oil | 40 |
| 1I | #2 N.C. Light Carnauba | 40 | L.V. Lomas refined bleached Rapeseed oil | 40 |
| 1J | BASF Wax OA Polyethylene | 40 | Rapeseed Oil | 40 |
| 1K | Hoechst Wax E | 40 | Blandol Mineral Oil | 40 |
| 1L | Duroxon H111 | 40 | Blandol Mineral Oil | 40 |
| 1M | BASF Wax OA | 60 | BASF EVA 1, an ethylene-vinyl acetate copolymer | 20 |
| 1N | Hoechst Wax E | 60 | Piccotex 100, Vinyl Toluene-alpha-methyl-stryene copolymer from Hercules | 20 |
| 1O | Hoechst Wax E | 60 | NIREZ 1085 a terpene resin from Reichold Chemicals Inc. | 20 |

Example 2

A nonionic wax-in-water emulsion was prepared as follows: 80 grams of Hoechst Wax E, a Montan-based wax, was mixed with 20 grams of ICI Tween 80, polyoxyethylene(20) sorbitan monooleate, available in Canada from Atkemix, Inc. This mixture was heated to between 110° and 120° C. and was then poured into 320 grams of deionized water at 95° to 98° C. which was being vigorously stirred in a 600 milliliter beaker. The melt was poured into the edge of the vortex in the water at a rate such that it was completely added in about 2 minutes. Subsequently, the resultant suspension was stirred at 95° to 98° C. for about 3 additional minutes, and was then transferred to a cold water bath and stirred rapidly for about 3 minutes until it reached a temperature of about 45° C. The resulting milky emulsion was transferred to a storage bottle and deionized water was added to provide an emulsion with a total weight of 400 grams containing 20 percent by weight of wax and 5 percent by weight of the emulsifier.

Example 3

A nonionic wax-in-water emulsion was prepared by repeating the process of Example 2 with the exception that Durachem #3 Refined Carnauba Wax replaced the Hoechst Wax E and Tween 60, a polyoxyethylene(20) sorbitan monostearate (Atkemix), replaced the Tween 80. The resulting milky emulsion was transferred to a storage bottle and deionized water was added to provide an emulsion with a total weight of 400 grams containing 20 percent by weight of wax and 5 percent by weight of the emulsifier.

Example 4

An oil-in-water emulsion was prepared as follows. A mixture of 80 grams of Blandol (light mineral oil available from Witco Company) and 20 grams of Tween 65, a polyoxyethylene (2) sorbitan tristearate emulsifier available from Atkemix, Inc., was thoroughly mixed and warmed to about 60° C., which mixture was then added to 320 grams of vigorously stirred deionized water maintained at about 50° C. Addition of the oil mixture to the water over about 3 minutes resulted in a mobile, white emulsion which was allowed to cool to room temperature. The product was then transferred to a storage bottle and the total weight was made up to 400 grams by the addition of deionized water. The resulting emulsion contained 20 percent by weight of oil and 5 percent by weight of the emulsifier.

Example 5

An oil-in-water emulsion was prepared by repeating the process of Example 4 with the exception that L. V. Lomas refined bleached rapeseed oil replaced the Blandol mineral oil and Span 40, a sorbitan monopalmitate emulsifier available from ICI, replaced the Tween 65 to yield a viscous, creamy emulsion. The product was then transferred to a storage bottle and the total weight was made up to 400 grams by the addition of deionized water. The resulting emulsion contained 20 percent by weight of oil and 5 percent by weight of the emulsifier.

Example 6

A leveling agent was prepared by dissolving 200 grams of Durachem water soluble wax, WS 215, in 800 milliliters of deionized water to yield a solution of leveling agent at 20 percent by weight solids.

Example 7

A polymer emulsion was prepared by diluting 250 grams of BASF Poligen ASN, an emulsion of a styrene-acrylic copolymer available at 40 percent by weight solids and having a film forming temperature of 50° C., with an equal weight of deionized water to yield a polymer emulsion at 20 percent by weight solids. Similar emulsions at 20 percent by weight solids were prepared by the same method by diluting, respectively, Poligen MV 150 and MV 160 crosslinked styrene-acrylic copolymers with equal amounts of water.

PREPARATION OF TRANSFER ELEMENT FORMULATIONS

Example 8

To a 60 milliliter wide mouth plastic jar was added 26.6 grams of an anionic emulsion of carnauba wax and rapeseed oil (1:1 ratio, wax-in-water emulsion containing oil as prepared in Example 1I), 13.3 grams of a 20 percent by weight aqueous solution of WS 215 wax (leveling agent as prepared in Example 6) and 5 grams of Basoflex Black 0060, a liquid predispersed carbon black pigment (40 percent by weight solids in water) available from BASF. The mixture thus formed was shaken vigorously by hand and a coating was made on 55 gauge polyethylene film (Philjo E-302 FH available from Phillips-Joanna) using a #10 wire-wound rod (nominal thickness: wet, 1.0 mil; dry, about 0.25 mil) to form a single-strike transfer element suitable for use in impact printing processes, such as typewriting. This formulation formed a uniform, level, well dispersed coating which adhered well to the polyethylene substrate. Small samples were cut out and taped onto Xerox® 4024 paper with the coated side down. The print quality was then evaluated by incorporating the samples into an IBM Selectric Model II typewriter. The coated film printed high quality characters with a high, uniform density (greater than 1.2 o.d. units) which were free from splatter, deletions, and other imperfections. Release from the substrate was clean, and the printed characters had excellent edge definition. However, this coating exhibited a faint background density in an area where the pinch roller of the typewriter passed over the back side of the coating. Other typewriter ribbons described in the Examples herein which were prepared containing polymer emulsion, did not exhibit this defect.

Example 9

The following ingredients were combined in a 1 ounce plastic jar: 5 grams of an aqueous emulsion of BASF polyethylene wax OA (wax-in-water emulsion as prepared in Example 1D), 5 grams of an emulsion of wax OA and rapeseed oil (1:1 ratio, wax-in-water emulsion containing oil as prepared in Example 1J), 5 grams of diluted BASF Poligen ASN emulsion (20 percent by weight solids, polymer emulsion as prepared in Example 7), 5 grams of a 20 percent by weight aqueous solution of WS 215 wax (leveling agent as prepared in Example 6), and 5 grams of BASF Basoflex Black predispersed pigment. The mixture was shaken vigorously and was then coated onto 55 gauge polyethylene as in Example 8 to form a single-strike transfer element suitable for use in impact printing processes, such as typewriting. This formulation formed a uniform, level, well dispersed coating which adhered well to the polyethylene substrate. Small samples were cut out and taped onto Xerox® 4024 paper with the coated side down. The print quality was then evaluated by incorporating the samples into an IBM Selectric Model II typewriter. The coated film printed high quality characters with a high, uniform density (greater than 1.2 o.d. units) which were free from splatter, deletions, and other imperfections. Release from the substrate was clean, and the printed characters had excellent edge definition and very good smear resistance.

Example 10

To a 60 milliliter wide mouth plastic jar, one half filled with ¼ inch diameter stainless steel balls, was added 8 grams of an emulsion of Hoechst Wax E and Blandol mineral oil (1:1 ratio, wax-in-water emulsion containing oil as prepared in Example 1K), 4 grams of a 20 percent by weight aqueous solution Durachem Wax WS 215 (leveling agent as prepared in Example 6), 8 grams of diluted BASF Poligen MV150 (polymer emulsion as prepared in Example 7), 1.25 grams of powdered clay (Englehard KWW grade, inert filler) and 1.25 grams of BASF Basoprint Black, a predispersed carbon black in a non-ionic emulsifier (80 percent by weight solids). The resulting mixture was ground on a ball mill for 16 hours to form a well-dispersed coating formulation. The coating formulation was coated on 55 gauge polyethylene as described in Example 8 using a #10 wire-wound rod (nominal coating thickness: wet, 1 mil; dry, about 0.3 mil) to form a single-strike transfer element suitable for use in impact printing processes, such as typewriting. This formulation formed a uniform, level, well dispersed coating which adhered well to the polyethylene substrate. Small samples were cut out and taped onto Xerox® 4024 paper with the coated side down. The print quality was then evaluated by incorporating the samples into an IBM Selectric Model II typewriter. The coated film printed high quality characters with a high, uniform density (greater than 1.2 o.d. units) which were free from splatter, deletions, and other imperfections. Release from the substrate was clean, and the printed characters had excellent edge definition and very good smear resistance.

Example 11

To a 60 milliliter plastic jar one half filled with ¼ inch diameter stainless steel balls was added 8 grams of an anionic emulsion of Duroxon H111 wax and mineral oil (1:1 ratio, wax-in-water emulsion containing oil as prepared in Example 1L), 4 grams of WS 215 wax solution (leveling agent as prepared in Example 6), 8 grams of diluted Poligen MV150 emulsion (polymer emulsion as prepared in Example 7), 1.25 grams of Johns-Manville Celite 577 (an inert filler material obtained from diatomaceous earth), and 2.5 grams of Basoprint Black predispersed pigment. The resulting mixture was ball-milled for 16 hours and was then coated onto 55 gauge polyethylene film as described in Example 8 to form a dry coating about 0.32 mil thick. The resulting transfer element was suitable for single-strike impact printing processes, such as typewriting. This formulation formed a uniform, level, well dispersed coating which adhered well to the polyethylene substrate. Small samples were cut out and taped onto Xerox® 4024 paper with the coated side down. The print quality was then evaluated by incorporating the samples into an IBM Selectric Model II typewriter. The coated transfer element film printed high quality characters with a high, uniform density (greater than 1.2 o.d. units) which were free from splatter, deletions, and other imperfections. Release from the substrate was clean, and the printed characters had excellent edge definition and very good smear resistance.

Example 12

To a 60 milliliter plastic jar one half filled with ¼ inch diameter stainless steel balls was added 5 grams of a non-ionic emulsion of Hoechst Wax E (wax-in-water emulsion as prepared in Example 2), 5 grams of a mineral oil emulsion (oil-in-water emulsion as prepared in Example 4), 5 grams of diluted Poligen MV160 (polymer emulsion as prepared in Example 7), 5 grams of WS 215 wax solution (leveling agent as prepared in Example 6), 2 grams of Johns-Manville Celite 577 (an inert filler material obtained from diatomaceous earth), and 1.25 grams of BASF Basoprint Black predispersed pigment. The mixture thus formed was ground on a ball mill for 16 hours and the resultant dispersion was coated onto 55 gauge polyethylene film as described in Example 8 to form a dry coated film about 0.32 mil thick. The resulting transfer element was suitable for single-strike impact printing processes, such as typewriting. This formulation formed a uniform, level, well dispersed coating which adhered well to the polyethylene substrate. Small samples were cut out and taped onto Xerox® 4024 paper with the coated side down. The print quality was then evaluated by incorporating the samples into an IBM Selectric Model II typewriter. The coated film printed high quality characters with a high, uniform density (greater than 1.2 optical density units) which were free from splatter, deletions, and other imperfections. Release from the substrate was clean, and the printed characters had excellent edge definition and very good smear resistance.

Example 13

The following ingredients were combined in a 60 milliliter plastic jar: 8.0 grams of anionic emulsion of Duroxon H111 wax and mineral oil (1:1 ratio, wax-in-water emulsion containing oil as prepared in Example 1H), 4 grams of a 20 percent by weight aqueous solution of Durachem WS 215 wax (leveling agent as prepared in Example 6), 8 grams of a 20 percent by weight emulsion of BASF Poligen ASN (polymer emulsion as prepared in Example 7) and 2.5 grams of BASF Basoflex black predispersed pigment. The mixture was shaken vigorously for 2 minutes and was then coated onto 55 gauge polyethylene film using a #10 wire-wound rod (nominal wet coat thickness 1.0 mil; dry thickness about 0.22 mil), and the coating was dried with gentle warming from a hot air blower. The resulting transfer element was suitable for single-strike impact printing processes, such as typewriting. This element contained very well dispersed pigment, was well-leveled, showed no pinholes, deletions, or other coating defects, and was of a uniform high optical density of over 1.2 optical density units. The transfer element was incorporated into an IBM Selectric II correcting typewriter and used to generate prints. This element generated good quality printed characters of high optical density which were free of deletions, splatter, and other defects. Release of the coating from the polyethylene film substrate was very clean and the printed characters showed well-defined edges. Smear resistance was also judged to be excellent. The "correctability" of prints made with this element was evaluated with commercially available "lift-off" tapes specifically supplied for use with Selectric machines (KO.REC.TYPE Adhesive Lift Off Tape, obtained from Barouh Eaton, product # LOT-CS-II/37822 and IBM Lift Off Tape, Product #1136433, obtained from Brown and Collett, Ltd.). Prints prepared from this element were completely or almost completely removed by using the correction key on the machine. This "correctability" was judged to be comparable or superior to that found with other ribbons specifically supplied for use in the IBM Selectric machines (KO.REC.TYPE KFR 150 High Yield Correctable Film Ribbon and IBM High Yield Correctable Ribbon For Selectric II Typewriters).

Example 14

To a 60 milliliter plastic jar was added 8 grams of an anionic emulsion of a 1:1 mixture of Hoechst Wax E and mineral oil (wax-in-water emulsion containing oil as prepared in Example 1K), 8 grams of diluted (20 percent by weight solids) Poligen MV 160 (polymer emulsion as prepared in Example 7), 4 grams of a 20 percent by weight of aqueous solution of Durachem Wax WS 215 (leveling agent as prepared in Example 6), and 2.5 grams of BASF Basoflex Black predispersed pigment. The mixture was mixed thoroughly by shaking the jar for 3 minutes. The coating formulation thus formed was coated onto 55 gauge polyethylene film using a #10 wire-wound rod (nominal wet film thickness: 1.0 mil; dry coat thickness: about 0.22 mil) and then drying the coating at room temperature. The resulting transfer element was suitable for single-strike impact printing processes, such as typewriting. This element contained very well dispered pigment, was well-leveled, showed no pinholes, deletions, or other coating defects, and was of a uniform high optical density of over 1.2 optical density units. The transfer element was incorporated into an IBM Selectric II correcting typewriter and used to generate prints. This element generated good quality printed characters of high optical density which were free of deletions, splatter, and other defects. Release of the coating from the polyethylene film substrate was very clean and the printed characters showed well-defined edges. Smear resistance was also judged to be excellent. The "correctability" of prints made with this element was evaluated with a number of commercially available "lift-off" tapes specifically supplied for use with Selectric machines. Prints prepared from this element were completely or almost completely removed by using the correction key on the machine. This "correctability" was judged to be comparable or superior to that found with other ribbons specifically supplied for use in the IBM Selectric machines.

Example 15

To a 125 milliliter jar one half filled with ¼ inch diameter stainless steel balls was added 5 grams of a non-ionic emulsion of Hoechst Wax E (wax-in-water emulsion as prepared in Example 2), 5 grams of a non-ionic emulsion of mineral oil (oil-in-water emulsion as prepared in Example 4), 10 grams of BASF Poligen MV150 diluted to 20 percent by weight solids as described in Example 7, 1 gram of a 20 percent by weight aqueous solution of Durachem WS 215 wax (leveling agent as prepared in Example 6), 1.0 gram of Johns-Manville Celite 577 (an inert filler material obtained from diatomaceous earth), and 1.25 grams of BASF Basoprint Black predispersed pigment. The mixture thus formed was processed on a laboratory ball mill for 23 hours and the resultant dispersion was then coated on 55 gauge polyethylene using a #10 wire-wound rod to form a coating with a nominal dry coating thickness of about 0.26 mil. The resulting transfer element was suitable for single-strike impact printing processes, such as typewriting. This element contained very well dispersed pigment, was well-leveled, showed no pinholes, deletions, or other coating defects, and was of a uniform high optical density of over 1.2 optical density units. The transfer element was incorporated into an IBM Selectric II correcting typewriter and used to generate prints. This element generated good quality printed characters of high optical density which were free of deletions, splatter, and other defects. Release of the coating from the polyethylene film substrate was very clean and the printed characters showed well-defined edges. Smear resistance was also judged to be excellent. The "correctability" of prints made with this element was evaluated with a number of commercially available "lift-off" tapes specifically supplied for use with Selectric machines. Prints prepared from this element were completely or almost completely removed by using the correction key on the machine. This "correctability" was judged to be comparable or superior to that found with other ribbons specifically supplied for use in the IBM Selectric machines.

Example 16

The following ingredients were combined in a 125 milliliter plastic jar one half full of ¼ inch diameter stainless steel balls: 5 grams of a non-ionic emulsion of mineral oil (oil-in-water emulsion as prepared in Example 4), 5 grams of a 20 percent by weight anionic emulsion of carnauba wax (wax-in-water emulsion as prepared in Example 1C), 10 grams of diluted BASF Poligen MV 160 (polymer emulsion as prepared in Example 7), 1 gram of a 20 percent by weight solution of Durachem WS 215 wax (leveling agent as prepared in Example 6), 2.0 grams of Celite 577 (inert filler material obtained from diatomaceous earth), and 1.94 grams of BASF Basoprint Black predispersed pigment. The mixture thus formed was processed on a ball mill for about 20 hours to yield a fine dispersion having 34.5 percent by weight total solids content. This mixture was coated on 55 gauge polyethylene using a #6 wire-wound rod (wet coating thickness: 0.6 milliliter; approximate dry coat thickness 0.21 milliliter). The resulting transfer element was suitable for single-strike impact printing processes, such as typewriting. This element contained very well dispersed pigment, was well-leveled, showed no pinholes, deletions, or other coating defects, and was of a uniform high optical density of over 1.2 optical density units. The transfer element was incorporated into an IBM Selectric II correcting typewriter and used to generate prints. This element generated good quality printed characters of high optical density which were free of deletions, splatter, and other defects. Release of the coating from the polyethylene film substrate was very clean and the printed characters showed well-defined edges. Smear resistance was also judged to be excellent. The "correctability" of prints made with this element was evaluated with a number of commercially available "lift-off" tapes specifically supplied for use with Selectric machines. Prints prepared from this element were completely or almost completely removed by using the correction key on the machine. This "correctability" was judged to be comparable or superior to that found with other ribbons specifically supplied for use in the IBM Selectric machines.

EXAMPLE 17

To a 125 milliliters plastic bottle was added 5 grams of a non-ionic Hoechst Wax E emulsion (wax-in-water emulsion as prepared in Example 2), 5 grams of a mineral oil emulsion (oil-in-water emulsion as prepared in Example 4), 10 grams of BASF Poligen MV 160, diluted to 20 percent by weight solids (polymer emulsion as prepared in Example 7), 2 grams of Johns-Manville Celite 577 (inert filler material obtained from diatomaceous earth), and 1.88 grams of BASF Basoprint Black predispersed carbon black pigment. The mixture thus formed was processed on a ball mill for 20 hours was then coated onto 55 gauge polyethylene film using a #10 wire-wound rod to a dry thickness of about 0.35 milliliter. The resulting transfer element was suitable for single-strike impact printing processes, such as typewriting. This element contained very well dispersed pigment, was well-leveled, showed no pinholes, deletions, or other coating defects, and was of a uniform high optical density of over 1.2 optical density units. The transfer element was incorporated into an IBM Selectric II correcting typewriter and used to generate prints. This element generated good quality printed characters of high optical density which were free of deletions, splatter, and other defects. Release of the coating from the polyethylene film substrate was very clean and the printed characters showed well-defined edges. Smear resistance was also judged to be excellent. The "correctability" of prints made with this element was evaluated with a number of commerically available "lift-off" tapes specifically supplied for use with Selectric machines. Prints prepared from this element were completely or almost completely removed by using the correction key on the machine. This "correctability" was judged to be comparable or superior to that found with other ribbons specifically supplied for use in the IBM Selectric machines.

EXAMPLE 18

To a 125 milliliter plastic jar half filled with ¼ inch stainless steel balls was added 40 grams of an anionic emulsion of carnauba wax (prepared as described in Example 1C) and 5 grams of BASF Basoflex Black pigment (40 percent by weight carbon black dispersed in water) and the jar was roll-milled for 16 hours. The resulting dispersion was then coated onto the unmetallized side of an 8 inch wide sheet of ½ mil thick Mylar® polyester film, which had been coated on one side by a thin (about 0.2 micron) film of aluminum metal, using a #20 wire-wound rod (nominal wet coating thickness about 2 mils; dry thickness about 0.4 mil). The coating was dried at room temperature to result in a dense, smooth, uniform coating. A 12 inch sample of this coated substrate was spliced into the ink donor film roll of a Diablo EPM-API Transfer Printer and the machine's internal test pattern was printed onto Xerox® 4024 paper.

The resulting image was of high optical density (greater than 1.2 o.d. units) and the coating was completely removed from the substrate film in the heated areas. Finger smear resistance was judged to be excellent in that hard rubbing was required to cause any noticeable smearing of the printed characters. The printed sheet also showed no background in the non-imaged areas.

However, the coating was somewhat brittle, and it cracked easily when the substrate film was creased. The edges of some characters and lines were noticeably ragged even to the naked eye. Furthermore, the coating tended to flake off the substrate relatively easily. These drawbacks are believed to be attributable to the absence of an oil emulsion and a polymer emulsion in the coating formulation.

Example 19

To a 125 milliliter plastic jar half filled with ¼ inch stainless steel balls was added 10 grams of a nonionic emulsion of Hoechst Wax E (20 percent by weight wax, prepared as described in Example 2), 10 grams of a nonionic emulsion of mineral oil (20 percent by weight solids, prepared as described in Example 4), 2 grams of Johns-Manville Celite 577, and 1.25 grams of BASF Basoprint Black predispersed pigment. The mixture was ball-milled for about 16 hours and the resulting dispersion was coated onto 55 gauge polyethylene film using a #10 wire-wound rod (wet film thickness about 1 mil; dry thickness about 0.3 mil). The dried coating was cut into pieces about 1 inch by 2 inches in size and four of these pieces were sandwiched between 5 sheets of Xerox® 4024 paper facedown as with carbon paper. Writing on the top sheet of the sandwiched layers using normal pressure with a medium ball point pen resulted in good reproduction of the top layer on all 4 underlying layers, albeit with somewhat reduced optical density on the bottom sheet.

Although this coated film was useful as a carbon paper it suffered from two major drawbacks. The coating, although of high optical density, was not uniform in that streaks of varying optical density running the length of the drawdown were clearly visible when the coated film was viewed through transmitted light. Secondly, the transferred images showed a slight smearing when they were rubbed with a finger. Both of the drawbacks are believed to be attributable to the absence of a polymer emulsion and a leveling agent in the coating formulation.

Other embodiments and modifications of the present invention may occur to those skilled in the art subsequent to a review of the information presented herein;

these embodiments and modifications, as well as equivalents thereof, are also included within the scope of this invention.

What is claimed is:

1. A process for preparing transfer elements which comprises (1) preparing a wax-in-water emulsion; (2) preparing an aqueous polymer emulsion; (3) admixing the wax-in-water emulsion and the aqueous polymer emulsion with a colorant and an oil to form an aqueous coating formulation containing substantially no volatile organic compounds; (4) coating the coating formulation onto a substrate; and (5) drying the coating formulation on the substrate to remove the water, wherein the oil is admixed with the wax-in-water emulsion, the aqueous polymer emulsion, and the colorant by either (a) preparing an oil-in-water emulsion and admixing the oil-in-water emulsion with the wax-in-water emulsion, the aqueous polymer emulsion, and the colorant; or (b) adding the oil to the wax-in-water emulsion prior to admixing the water-in-water emulsion with the other coating formulation ingredients.

2. A process according to claim 1 wherein the substrate has a thickness of from about 0.4 to about 1.2 microns.

3. A process according to claim 1 wherein the wax is selected from the group consisting of natural waxes, mineral waxes, synthetic waxes, Fischer-Tropsch waxes, oxidized Fischer-Tropsch waxes, petroleum waxes, and mixtures thereof.

4. A process according to claim 1 wherein the wax-in-water emulsion contains a wax selected from the group consisting of beeswax, carnauba wax, bayberry wax, candellila wax, Montan wax, ozokerite, low molecular weight polyethylene waxes, vinyl ether waxes, paraffin waxes, and mixtures thereof.

5. A process according to claim 1 wherein the wax-in-water emulsion contains wax soluble additives.

6. A process according to claim 5 wherein the wax soluble additives are selected from the group consisting of mineral oils, vegetable oils, dyes, terpene resins, ethylene-vinyl acetate copolymers, vinyl toluene/methylstyrene copolymers, and mixtures thereof.

7. A process according to claim 1 wherein the oil is selected from the group consisting of vegetable oils, mineral oils, animal oils, and mixtures thereof.

8. A process according to claim 7 wherein the oil is selected from the group consisting of sunflower oil, rapeseed oil, and mineral oils with a viscosity of from about 10 to about 100 centipoise and a boiling point of over 300° C.

9. A process according to claim 1 wherein the polymer is selected from the group consisting of acrylic polymers, acrylic copolymers, and mixtures thereof.

10. A process according to claim 9 wherein the polymer is selected from the group consisting of alkyl acrylate homopolymers wherein the alkyl group has from about 5 to about 18 carbon atoms, alkyl acrylate copolymers wherein the alkyl groups have from about 5 to about 18 carbon atoms, alkyl methacrylate homopolymers wherein the alkyl group has from about 5 to about 18 carbon atoms, alkyl methacrylate copolymers wherein the alkyl groups have from about 5 to about 18 carbon atoms, alkyl acrylate/alkyl methacrylate copolymers wherein the alkyl groups have from about 5 to about 18 carbon atoms, styrene/alkyl acrylate copolymers wherein the alkyl groups have from about 5 to about 18 carbon atoms, styrene/alkyl methacrylate copolymers wherein the alkyl groups have from about 5 to about 18 carbon atoms, butadiene/alkyl acrylate copolymers wherein the alkyl groups have from about 5 to about 18 carbon atoms, butadiene/alkyl methacrylate copolymers wherein the alkyl groups have from about 5 to about 18 carbon atoms, and mixtures thereof.

11. A process according to claim 1 wherein the coating formulation also contains a water-soluble leveling agent.

12. A process according to claim 11 wherein the water-soluble leveling agent is selected from the group consisting of cellulosic derivatives, polyvinyl alcohols, polyalkylene glycols, perfluorinated surfactants, and mixtures thereof.

13. A process according to claim 1 wherein the coating formulation also contains an inert filler.

14. A process according to claim 13 wherein the inert filler is selected from the group consisting of celite, talc, chalk, zeolite, silica, high molecular weight polyethylene, and mixtures thereof.

15. A process according to claim 14 wherein the inert filler has an average particle diameter of from about 0.1 to about 50 microns.

16. A process according to claim 1 wherein in the coating formulation water is present in an amount of from about 70 to about 90 percent by weight and the solid content of the formulation is from about 10 to about 30 percent by weight, said solids content comprising the wax in an amount of from about 5 to about 50 percent by weight, the oil in an amount of from about 1 to about 50 percent by weight, the polymer in an amount of from about 5 to about 50 percent by weight, and the colorant in an amount of from about 5 to about 50 percent by weight.

17. A process according to claim 16 wherein the coating formulation also contains a water-soluble leveling agent in an amount of from about 0.5 to about 25 percent by weight of the solids content of the formulation.

18. A process according to claim 16 wherein the coating formulation also contains an inert filler in an amount of from about 5 to about 50 percent by weight of the solids content of the formulation.

19. A process according to claim 1 wherein the oil is admixed with the wax-in-water emulsion, the aqueous polymer emulsion, and the colorant by preparing an oil-in-water emulsion and admixing the oil-in-water emulsion with the wax-in-water emulsion, the aqueous polymer emulsion, and the colorant.

20. A process according to claim 1 wherein the oil is admixed with the wax-in-water emulsion, the aqueous polymer emulsion, and the colorant by adding the oil to the wax-in-water emulsion prior to admixing the wax-in-water emulsion with the other coating formulation ingredients.

21. A process according to claim 1 wherein formulation is coated onto the substrate in a thickness of from about 0.05 to about 2.5 mils.

22. A thermal printing process which comprises (1) preparing a transfer element by the process of claim 1; (2) incorporating into the thermal printing apparatus the transfer element thus prepared; and (3) applying heat imagewise to the element, causing the coating to be heated and transferred from the transfer element substrate to a receiver sheet.

23. An impact printing process which comprises (1) preparing a transfer element by the process of claim 1; (2) incorporating into an impact printing apparatus the transfer element thus prepared; (3) contacting the transfer element thus prepared with a receiver sheet; and (4) applying pressure imagewise to the transfer element, causing the coating to be transferred from the transfer element substrate to the receiver sheet.

24. An impact printing process according to claim 23 wherein the transfer element is prepared from a coating formulation that contains an inert filler.

25. An impact printing process according to claim 24 wherein the inert filler is present in the coating formulation in an amount of from about 5 to about 40 percent by weight.

26. An impact printing process according to claim 24 wherein the inert filler is selected from the group consisting of celite, talc, chalk, zeolite, silica, high molecular weight polyethylene, and mixtures thereof.

27. An impact printing process according to claim 24 wherein the inert filler has an average particle diameter of from about 0.1 to about 50 microns.

28. An impact printing process according to claim 23 wherein the coating transferred to the receiver sheet is subsequently removed from the receiver sheet.

29. An imaging process which comprises (1) preparing a transfer element by the process of claim 1; (2) contacting the transfer element thus prepared with a receiver sheet; and (3) applying pressure imagewise to the element, causing the coating to be transferred from the transfer element substrate to the receiver sheet.

* * * * *